Sept. 11, 1951 V. MORALES 2,567,852

RECORDING AND REPRODUCING TONE ARM ATTACHMENT

Filed Oct. 22, 1947

INVENTOR.
VALENTIN MORALES
BY Wilfred E. Lawson
ATTORNEY

Patented Sept. 11, 1951 2,567,852

UNITED STATES PATENT OFFICE 2,567,852

RECORDING AND REPRODUCING TONE ARM ATTACHMENT

Valentin Morales, Los Angeles, Calif.

Application October 22, 1947, Serial No. 781,399

2 Claims. (Cl. 274—24)

This invention relates to the recording and reproducing of tones or sounds on and from records, more particularly disk records.

The present invention is directed particularly to an improved attachment for the tone arm of a record playing machine, whereby an additional pick-up may be employed to permit the playing or reproducing of two recordings simultaneously.

A great many singers and instrumentalists who are not in the professional class enjoy making recordings of their voices or their music for home consumption. For this purpose, as is well known, many commercial projects provide recording machines where persons may go and make recordings of any desired character which they take home and reproduce at times for their own pleasure. Under such circumstances, however, where a person wishes to make a recording of his singing voice it is not feasible to have a musical accompaniment.

In the light of the foregoing it is an object of the present invention to provide musical recordings upon records which are only partly filled with such recording whereby a person may, by means of the tone arm attachment hereinafter set forth, make a recording of his singing voice on the record to the accompaniment of music being produced from the same record and later by the employment of the same tone arm attachment reproduce both the singing voice and the musical accompaniment together.

Another object of the invention is to provide an auxiliary needle carrying tone arm either for recording or reproducing purposes, which is designed in a novel manner whereby it may be easily and quickly attached to any standard recording and tone arm, whereby two needles may be employed simultaneously for recording or for reproducing from a record simultaneously, two complementary recordings.

The invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

Figure 1:
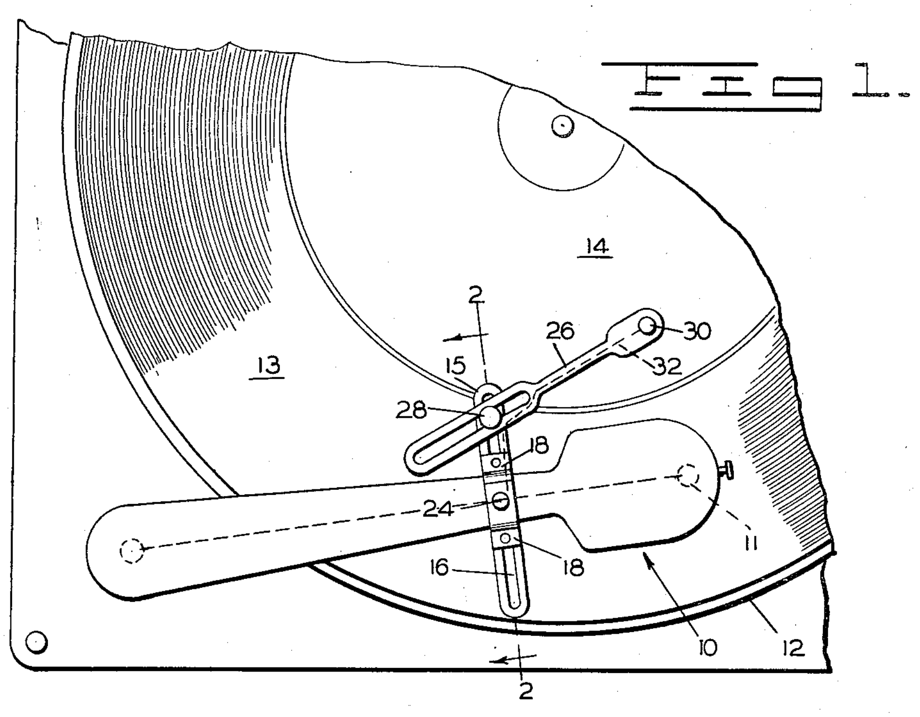
Figure 1 is a view in top plan of a portion of a record and the tone arm attachment constructed in accordance with the present invention, the attachment being mounted on a tone arm.
Figures 2, 3, 4:
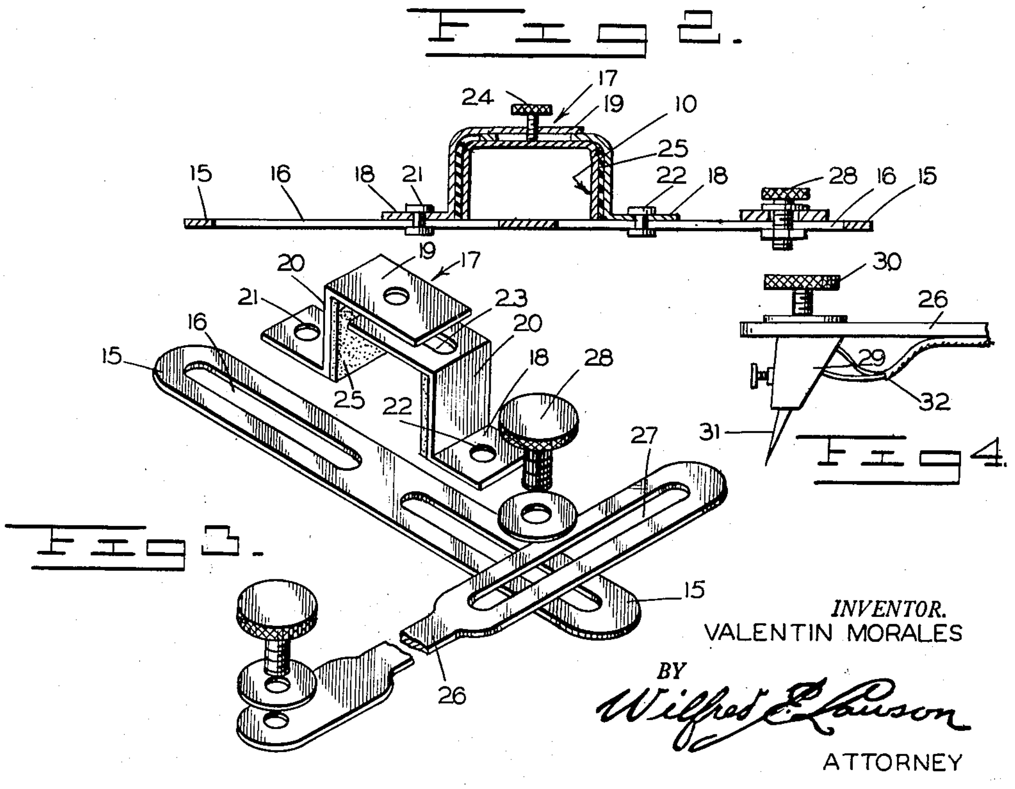
Figure 2 is a sectional view taken substantially on the line 2—2 of Figure 1.
Figure 3 is a detail showing of the attachment with the parts in exploded relation.
Figure 4 is a detail view of the needle mounting for the attachment.

Referring now more particularly to the drawing there is shown in a conventional manner a tone arm 10 which may be representative of any one of the various type or forms of phonograph tone arms on the market, the needle of such tone arm being designated 11. In association with the showing of the tone arm 10 is shown a record disk 12 having thereon two recording spaces which are designated 13 and 14.

In accordance with the present invention the outer space 13 would have a recording of a musical instrument or musical instruments, such, for example, as an orchestra, while the inner space would have a recording of vocal music, of recited poetry or of any other type of recording which might be appropriately played with the reproduction of the music recorded in the outer space.

In the use of the tone arm attachment it is contemplated to produce for sale the disks with a musical recording applied but with the inner space blank whereby the purchaser may by the use of a suitable recording instrument make any other type of recording he may desire such as a vocal selection to the accompaniment of the music. Subsequently, by the use of the same attachment, a reproduction may be made of the vocal recording together with the instrumental recording.

The extra needle carrying attachment for the recording and tone arm, comprises a relatively long flat bar 15 having therein the two aligned slots 16 which extend lengthwise of the bar as shown. This bar 15 is designed to position across the under side of a tone arm such as that here illustrated.

Upon the top of the bar 15 is a securing unit or clamp which is generally designated 17 and which comprises the two angled jaw members *a* and *b*. The two members *a* and *b* are of substantially the same form in that each comprises the two foot portions 18, the two parallel offset top portions 19 and the connecting vertical intermediate portions 20. The portions 18 of the two parts *a* and *b* rest upon the top of the bar 15 while the portions 19 are in overlapping relation and the portion 18 of the part *a* is slidably connected with the bar 15 by the rivet 21 which engages in the slot 16 over which this portion is positioned whereas the portion 18 of the part *b* is fixed to the bar 15 by rivet 22 which passes through the bar.

The upper portion 19 of the part *b* has a longitudinal slot therein as indicated at 23 while the adjacent corresponding portion 19 of the other part has a set screw threaded therethrough as indicated at 24 for binding contact with the top of the tone arm which is encased between the bar 15 and the overlapping portions 19 of the clamp element.

In order to prevent noise or rattle the inner faces of the vertical parts 20 are provided with the sound deadening pads 25, which may be of rubber of any other suitable material.

The numeral 26 designates the auxiliary needle arm, one end of which is provided with the longitudinal slot 27. This slotted end overlies a slot 16 of the bar 15 as shown and the two parts are secured in adjusted relation by the clamp screw 28.

At the opposite end of the auxiliary arm 26 is provided a needle socket 29 with a securing screw 30 whereby to secure a needle 31 to the arm. This needle end of the arm carries an electric pick up, not shown, which may be of any standard type and from which runs the current conducting wire 32 which carries the current pulsations to the amplifying mechanism of the machine along with pulsations picked up by the needle 11.

It will be understood, of course, that when the arm 26 is employed for making a recording upon the space 14 the wire 32 will be connected with the proper mechanism of the recording machine to transmit the required vibrations to the needle 31 for making the recording impressions in the disk.

By reason of the provision of the adjustable clamp unit 17 it will be seen that the auxiliary tone arm of the present invention may be readily applied to any standard reproducing machine tone arm or the arm of a recording machine and by properly setting the angular relation of the bar 15 and the arm 26 the auxiliary arm and the regular tone arm on which it is mounted, will be caused to move together across the face of the record disk.

I claim:

1. As an attachment to a record disk recording and tone arm, an auxiliary needle carrying device comprising a relatively long flat bar adapted to be positioned across a tone arm, said flat bar having a slot formed longitudinally therein, clamping means carried by said bar comprising a two part unit in which each of said parts has a bottom portion positioned upon said bar and a top portion spaced from the bar, the said top portions of the unit being in overlapping relation and one thereof having a longitudinal slot therein, a set screw carried by the other one of the said top portions for extension through the last mentioned slot for engagement with the top of the tone arm, one of the two portions of the clamping unit being connected to said flat bar for longitudinal adjustment thereon, an auxiliary arm having a longitudinal slot therein, adjacent to one end, the said slot of the auxiliary arm overlying the slotted portion of the flat bar, means extending through the slot of the auxiliary arm and the adjacent slotted portion of the flat bar for adjustably securing the flat bar and the auxiliary arm in working relation, and a needle carrying pick up means carried by the auxiliary arm adjacent to its other end.

2. A device of the character stated in claim 1, with vibration absorbing pads carried by said clamp unit upon the inner sides of the two portions thereof, for contact with a tone arm with which the clamp unit is engaged.

VALENTIN MORALES.

REFERENCES CITED

The following references are of record in the file of this patent:

UNITED STATES PATENTS

| Number | Name | Date |
|---|---|---|
| 714,707 | Jones | Dec. 2, 1902 |
| 1,468,455 | Bristol | Sept. 8, 1923 |
| 1,638,424 | Webb | Aug. 9, 1927 |
| 1,752,357 | Wiener | Apr. 1, 1930 |
| 2,314,345 | Cortella | Mar. 23, 1943 |
| 2,328,862 | Thompson | Sept. 7, 1943 |
| 2,489,685 | Sultan | Nov. 29, 1949 |

FOREIGN PATENTS

| Number | Country | Date |
|---|---|---|
| 716,439 | France | Oct. 6, 1931 |